June 16, 1942.  J. T. MULLEN  2,286,756
DISPLAY SIGN
Filed Feb. 3, 1941

INVENTOR
James T. Mullen
BY
ATTORNEYS.

Patented June 16, 1942

2,286,756

UNITED STATES PATENT OFFICE 2,286,756

DISPLAY SIGN

James T. Mullen, Cleveland, Ohio, assignor to The Dyment Company, Cleveland, Ohio, a corporation Application February 3, 1941, Serial No. 377,235

5 Claims. (Cl. 40—125)

The present invention appertains to improvements in display signs and particularly to an improved construction of such sign useful for employment in conjunction with annular bodies such as automotive vehicle tires.

It has been proposed heretofore, where such tires are displayed in sales rooms or stores for sale, to apply thereto a sign containing any suitable advertising matter. Such signs have involved a construction commonly called a tire insert because the sign is usually composed of a round body disposed within the corresponding body of the tire, the space at the middle of the tire affording ample sign space for whatever advertising is to be displayed.

A simple construction of such display signs has comprised an insert simply disposed within the tire and held from displacement forwardly and rearwardly by loose arrangement between the front and rear rim flanges of the tire carcass.

The present invention proposes an improved sign of the above type which is formed of a round body equipped with tabs so arranged and formed as to have a spring action for pressing forward the body against the front rim flange whereby to maintain the sign in a proper upright position easily to be viewed and maintaining said body in substantially parallel arrangement to the plane of the tire. The improved construction of the invention also provides tabs that assist in positioning the sign by having edge interlocking cooperation with the tire member in which the sign is disposed.

The preferred embodiment of the invention is illustrated in the accompanying drawing and fully described in the following specification, and in the said drawing.

Figure 1:
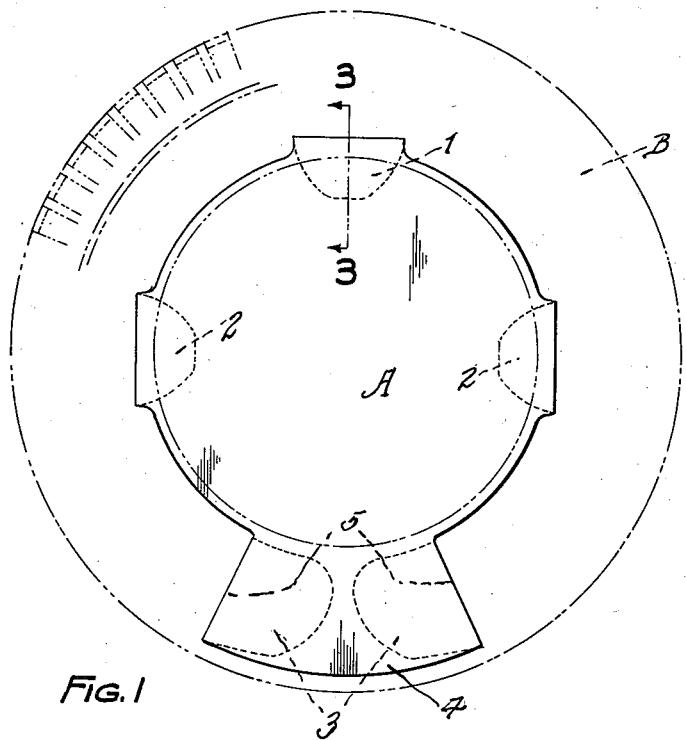
Figure 1 is a side view showing the display sign of the construction of the invention, the disposition of the same in a tire being illustrated by showing the tire in dotted lines in proper relation to the display sign.
Figure 2:
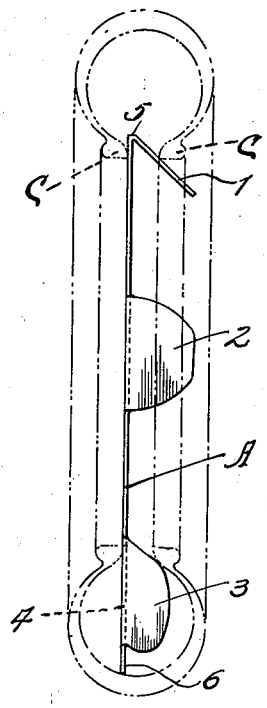
Figure 2 is a side elevation of the sign of the invention showing how it coacts with the tire parts, the tire again being illustrated in dotted lines.
Figure 4:
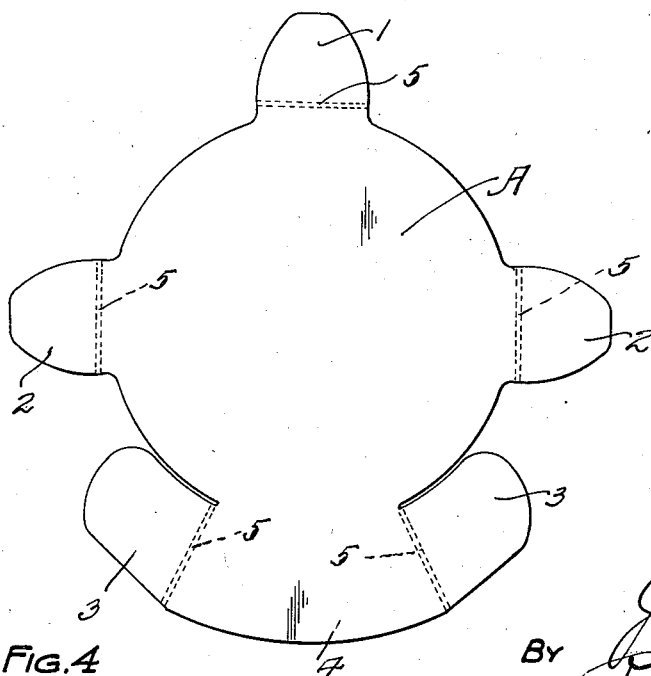
Figure 4 is a plan view of the blank of material from which the sign is made, the parts all disposed in the same plane as when arranged for shipment, previously to folding the tabs that are intended to hold the sign in proper position within the tire.
Figure 3:
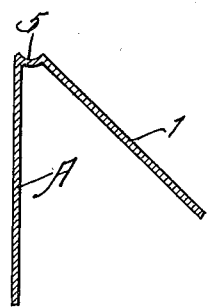
Figure 3 is a sectional view taken on the line 3—3 of Figure 1.

First referring to Figure 4 of the drawing, the display sign of the invention comprises the body A which is of round form and slightly larger in diameter preferably than the diameter of the opening of the tire in which it is to be disposed as seen in Figures 1 and 2. The body A is formed with an upper tab 1, side tabs 2, and bottom tabs 3. The upper and side tabs aforesaid extend laterally from the body in the plane thereof whilst the tabs 3 extend in a direction circumferentially of the body, being carried by an extension 4 projecting downwardly from the body and of somewhat dovetail shape.

The various tabs 1, 2, and 3 are hinged to the body and extension 4 by means of hinge elements 5 which are of a conventional type known in the art as creasings.

These hinge elements 5 are such as to tend to cause the particular tabs connected by them to the body to spring away from the body with a sort of resilient action, or if the tabs are such as those numbered 3 carried by the extension 4, the elements 5 have the same action of springing the tabs away from the extension 4 due to the peculiar formation of the hinge part 5.

The body and the various tabs are made from a single blank of material such as cardboard, strawboard, or the like, having to a certain extent inherent spring action.

The manner of use of the display sign as above described is well illustrated in Figures 1 and 2 in which the tire B is illustrated by dotted lines in side elevation and cross sectional views respectively. By disposing the body A within the hollow portion of the tire 1, its edges and the main part of the body arranged to occupy the circular space surrounded by the tire, the display sign will be properly held in place. In order to accomplish the above, the tabs 1 and 2 are bent inwardly from the hinge sections 5 and tending to spring away from the body they bear against the inner of the rim flanges C of the tire and tend to push the body A in flat contacting engagement with the outer rim flanges. The extension 4 is of such a length that it will rest upon the inner round surface of the tread portion of the tire as shown at 6 and thus properly position the sign vertically so as to centralize the body A at the central opening or space of the tire.

The tabs 3 when bent inwardly have a tendency to hook beneath the inner rim flange C of the tire and thus coact with the tabs 1 and 2 to maintain the sign firmly in contact with the outer rim flange C of said tire. The action of the tabs 3 however is to contact with the inner rim flange C of the tire at the upper edges of said tabs 3, the same having an edgewise bearing against the inner tire flange C.

By the above construction I have secured a very simple display sign which can be very quickly emplaced within the tire and caused to assume a properly adjusted position in a plane parallel with the body of the tire and maintained in contact with the inner edge of the outer tire flange C.

Having thus described my invention, what I claim as new and desire to secure by Letters Patent of the United States, is—

1. A display sign for tires or like annular bodies, comprising a body having upper and side tabs projecting therefrom, resiliently connected thereto, and foldable about the said connection so as to tend to cause the tabs to resiliently move away from the side of the body, and engage the rim flange of the tire, said body being formed with an extension at its lower end to engage the lower portion of the tire at the inner side of the tread thereof for fixing the vertical adjustment of the sign body in relation to the space surrounded by the tire.

2. A display sign substantially as claimed in claim 1, combined with tabs projecting from the opposite sides of the extension to the lower portion of the body.

3. As a new article of manufacture, a display sign comprising a blank of material formed with upper and side tabs projecting from the body thereof, said body being of round shape and having a dovetail shaped extension at its lower end, the lower edge of which is curved and tabs extending from the side edges of the dovetailed extension in a circumferential manner around the lower portion of the body, said tabs being resiliently connected with the parts carrying the same whereby the tabs have resilient movement toward and from the body and extension when bent at the connection with the said parts for application to a tire or similar annular member.

4. A display sign substantially as claimed in claim 1, combined with tabs projecting from the opposite sides of the extension to the lower portion of the body, and extending circumferentially about the lower edge portion of the body of the sign, the last mentioned tabs being connected resiliently with the extension from which they project and being foldable about the said connection so as to tend to cause the edges of the said tabs to move into engagement with the rim flange of the tire.

5. A display sign for emplacement within tires to occupy the annular space surrounded by the tire, comprising a body having tabs resiliently connected thereto and projecting therefrom foldable about their connection with the said body toward the rearward portion thereof whereby the resiliency of their connection will tend to cause the tabs to move into engagement with the rearward rim flange of the tire, and a forward annular portion of the sign body to move into engagement with the forward rim flange, for fixing the position of the body substantially centrally of the said annular space.

JAMES T. MULLEN.